(12) United States Patent
Wan

(10) Patent No.: US 7,673,415 B2
(45) Date of Patent: Mar. 9, 2010

(54) APPARATUS AND METHOD FOR REGULATION OF CARBON DIOXIDE CONTENT IN ATMOSPHERE

(76) Inventor: Youbao Wan, Apt. #604, Bldg 4, Da Shu Jing Gang Wan, Chengnan Road, Jiaxing City (CN) 314001

( * ) Notice: Subject to any disclaimer, the term of this patent is extended or adjusted under 35 U.S.C. 154(b) by 180 days.

(21) Appl. No.: 11/960,708

(22) Filed: Dec. 20, 2007

(65) Prior Publication Data

US 2009/0107038 A1 Apr. 30, 2009

Related U.S. Application Data

(63) Continuation-in-part of application No. 11/932,036, filed on Oct. 31, 2007.

(51) Int. Cl.
*A01G 13/02* (2006.01)
(52) U.S. Cl. .......................... 47/20.1; 47/29.5
(58) Field of Classification Search ................ D13/102; D25/56
See application file for complete search history.

(56) References Cited

U.S. PATENT DOCUMENTS

| | | | | |
|---|---|---|---|---|
| 1,100,273 | A | * | 6/1914 | Wiard ............................ 52/63 |
| D168,896 | S | * | 2/1953 | Jones ........................... D25/56 |
| 2,986,842 | A | * | 6/1961 | Toulmin, Jr. ............. 47/58.1 R |
| 2,990,012 | A | * | 6/1961 | Riebling ...................... 160/193 |
| 3,396,822 | A | * | 8/1968 | Guilbert, Jr. ................. 187/334 |
| 4,194,319 | A | * | 3/1980 | Crawford ..................... 47/21.1 |
| 6,396,239 | B1 | * | 5/2002 | Benn et al. ................... 320/101 |
| 7,520,091 | B2 | * | 4/2009 | Friedman ........................ 52/63 |
| 2004/0065025 | A1 | * | 4/2004 | Durham ......................... 52/73 |
| 2005/0091916 | A1 | * | 5/2005 | Faris .............................. 47/39 |
| 2009/0107038 | A1 | * | 4/2009 | Wan ............................ 47/22.1 |

* cited by examiner

*Primary Examiner*—Francis T Palo
(74) *Attorney, Agent, or Firm*—Yichuan Pan

(57) ABSTRACT

An apparatus to promote plant growth in vast desert areas is disclosed. The apparatus comprises a blocking plate pivotally jointed to at least two support posts. The blocking plate is operated by an electrical motor to turn wheels secured to a rotary rod to extend or pull back cables connecting the blocking plate and the wheels in order to swing the blocking plate between an approximately horizontal position and one or two approximately vertical positions in order to protect the plants underneath and promote plant growth. The apparatus can include a solar cell layer in the blocking plate, or attach a wind turbine at the top of one of the support posts to generate electrical energy from the extreme desert sunlight and windstorm. Further, rain gutters can be formed onto the blocking plate to collect and distribute rainwater.

16 Claims, 4 Drawing Sheets

FIG. 3
A - A
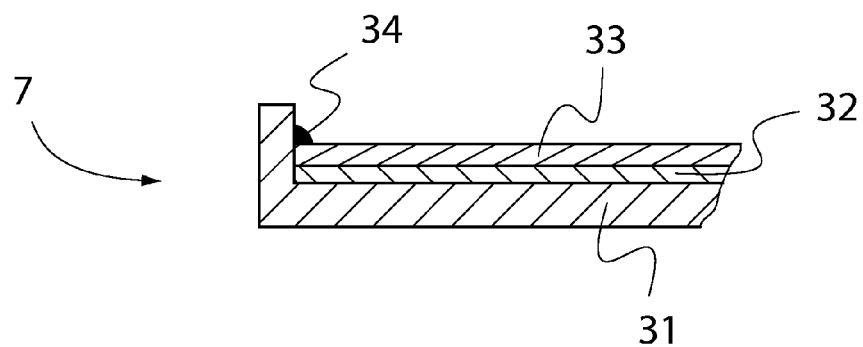
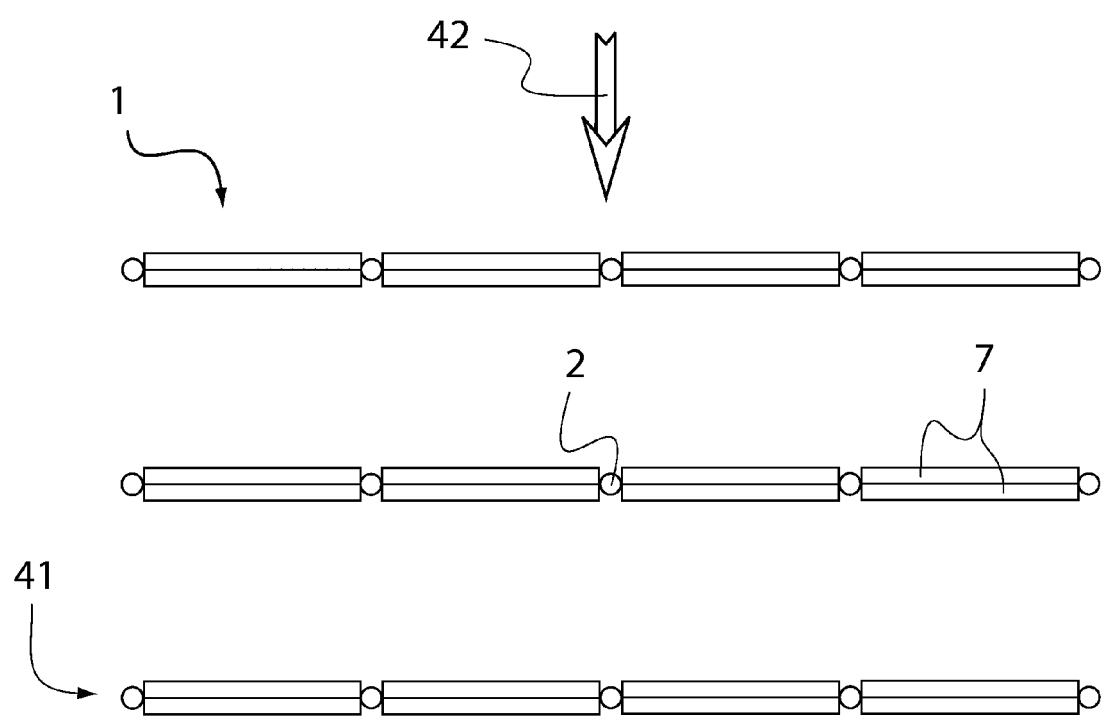
FIG. 4

APPARATUS AND METHOD FOR REGULATION OF CARBON DIOXIDE CONTENT IN ATMOSPHERE

FIELD OF THE INVENTION

The present invention relates generally to environmental protection, and more particularly to plant growth promotion in vast desert areas so as to regulate carbon dioxide content in air, to generate electrical energy, and to collect rainwater in desert areas.

BACKGROUND OF THE INVENTION

Global warming caused by the increase of the concentration of greenhouse gasses, especially carbon dioxide, in air is becoming ever more evident and is changing the global ecosystem. In 2007, the United Nations Intergovernmental Panel on Climate Change (IPCC) published its *Fourth Assessment Report*, projecting that if global warming is not effectively controlled, human being will face severe consequences. Another report, *Meeting the Climate Change*, published in 2005 by the International Climate Change Task Force, clearly pointed out that the continuous rising of global temperature within the next decades would cause extreme weather events, such as more destructive and frequent droughts and floods, sea level rising which damages communities, cities and island nations, and agricultural production.

One of the consequences of global warming is desertization, the process or evolution of land mass becoming dry, arid and barren. Desertization has been a major problem on a global scale, and is largely caused by the continued environment hazards brought about by human activities, and especially the green house effect. A study by Compton J. Tucher et al. revealed that the Sahara desert in Africa unsteadily expanded southward for about 130 kilometers from 1980 to 1990. In China, where desert land is estimated to make up about 17% of its total land, desert area is increasing at an annual rate of 2,460 square kilometers. In those provinces where desert boundaries are located, annual desertization rate is more than 4%, severally impacting local human and natural habitats.

There have been many efforts worldwide to try to reduce the threat of global warming. One of the leading solutions is to cut carbon dioxide emission in order to reduce the greenhouse effect. *The Kyoto Protocol* as established by the United Nations Framework Convention on Climate Change and ratified by its member countries requires, in the form of a treaty, the countries' commitments to reduce their emissions of carbon dioxide and five other greenhouse gases, or engage in emissions trading if they maintain or increase emissions of these gases. However, this solution is at the cost of economical development, and countries such as United States and Australia have chosen to stay away from it.

Another more attractive way is to remove carbon dioxide from the atmosphere in order to reduce carbon dioxide concentration. Professor Klaus Lackner at Columbia University has successfully developed a carbon dioxide in air capture technology, and designed a synthetic tree to absorb carbon dioxide from the atmosphere. He proposed that eventually the removed carbon dioxide would be stored underground safely and permanently. However, running the synthetic tree requires a lot of energy, inevitably generating more carbon dioxide. In 1986, Dr. John Martin of the Moss Landing Marine Laboratory proposed to pour iron fertilizer in Antarctic Ocean to create algae bloom based on the hypothesis that algae did not grow well in ocean due to iron deficiency. Millions of square miles of algae gardens can be created to consume billions of tons of carbon dioxide. Many small scale experiments have been conducted to prove that Dr. Martin's proposal can become a working solution to global warming. However, scientific evidence is so far incomplete. And the scale of iron enrichment and algae growth may cause unintended consequences, such as interruption of the ocean ecosystem.

Other proposals have been put forth in order to prevent global warning. In 2006, Roger Angel, a noted astronomer at the University of Arizona, outlined a plan to put into orbit trillions of small lenses that would bend sunlight away from earth. However, it will take tens of millions of rocket launches and cost a tremendous amount of resources to implement the plan. Further, it will reduce sunlight on earth, which will slowdown vegetation growth and consequently result in less carbon dioxide consumption from air.

Some took lessons from the nature's offering. In 1991, the volcano eruption on Mount Pinatubo of Philippines discharged millions of tons of sulfur dioxide into atmosphere, resulting in a worldwide temperature decrease over the next few years. Inspired by the event, some scientists, including Nobel laureate Paul Crutzen, proposed to inject huge amount of sulfur dioxide into atmosphere to form a sunlight deflecting layer in order to reduce sunshine intensity on earth and atmospheric temperature. However, it is believed that such proposal is too risky to implement for the time being and may cause environmental consequences such as degraded water supply quality and acid rain.

The Mother Nature has actually provided the most original and effective solution to the greenhouse effect and global warming—photosynthesis—that takes sunlight and absorbs carbon dioxide from air and produces glucose and emits oxygen. Many considered utilizing the vast desert area to grow plants, which not only removes carbon dioxide but also helps absorb other pollutants from air. One proposal was to air drop drought-resistant plant seeds during rain season, in hope that plants will grow up to alter the dry and arid condition. However, due to the hostile environment in desert, such as the extreme temperature fluctuation between day and night and the lack of water and nutrients, the efforts yielded little success. Human-aided forestation in desert area has also been attempted in many places. Nevertheless, due to the lack of requisite water and nutrients planted trees could not grow strong enough to counter the severe sun exposure and the destructive force of sandstorms. Efforts in this regard were proven to be ineffective.

Chinese Patent Application No. 00122918.4 by Yuanyong Sheng discloses a practice of planting square matrix of dummy trees to form an X-shaped and interconnected base to block wind and sandstorm at ground level. However, dummy trees themselves take land space and do not consume carbon dioxide. Also, they are incapable of protecting plants from severe sunlight damage. Another Chinese Patent Application, No. 200410081493.2 by Yu Cao, provides a closed transparent structure with water-collecting and irrigation systems. The closed transparent structure keeps water from evaporating. However, plants raised in this type of environment have great difficulties to survive in open desert. So the closed structure needs to stay with the plants. And, the invention is suitable to small areas, but not to be expanded to cover large areas.

SUMMARY OF THE INVENTION

It is therefore an object of the invention to provide a plant growth promotion apparatus that can be implemented in large desert areas. The plant growth promotion apparatus comprises support posts erected on the ground, a blocking plate supported by the support posts and movable between an approximately horizontal blocking position for protection of the plants underneath and one or two approximately vertical open positions to expose the underneath plants or to block the wind storm, and an electric motor that operates the movable blocking plate between the blocking and open positions. The plant growth promotion apparatus constructed in such a manner can be implemented in vast desert areas to promote plant growth, as such to achieve the goal of regulating carbon dioxide content in the atmosphere through photosynthesis.

According to one aspect of the invention, the movable blocking plate has a multiple layer structure, including a layer of solar cell capable of converting sunlight into electrical energy.

According to another aspect of the invention, the plant growth promotion apparatus further comprises a wind turbine attached to one of the support posts to generate electrical energy from wind.

According yet to another aspect of the invention, it is preferred that at least one gutter be formed onto the blocking plate to collect rainwater that can be distributed for irrigation.

BRIEF DESCRIPTION OF THE DRAWINGS

These and other objects and features of the invention will become more fully apparent from the following description and appended claims taken in conjunction with the following drawings, where like reference numbers indicate identical or functionally similar elements.

FIG. 3 is a cross-sectional view of the blocking plate in FIG. 1 taken along the line of A-A;

FIG. 4 is a schematic of an arrangement of many plant growth promotion apparatuses to protect plants against seasonal wind with predictable wind direction;

DETAILED DESCRIPTION OF THE INVENTION

The present description will be directed in particular to elements forming part of, or cooperating more directly with, apparatus and methods in accordance with the present invention. It is to be understood that elements not specifically shown or described may take various forms well known to those skilled in the art.

Figure 1:
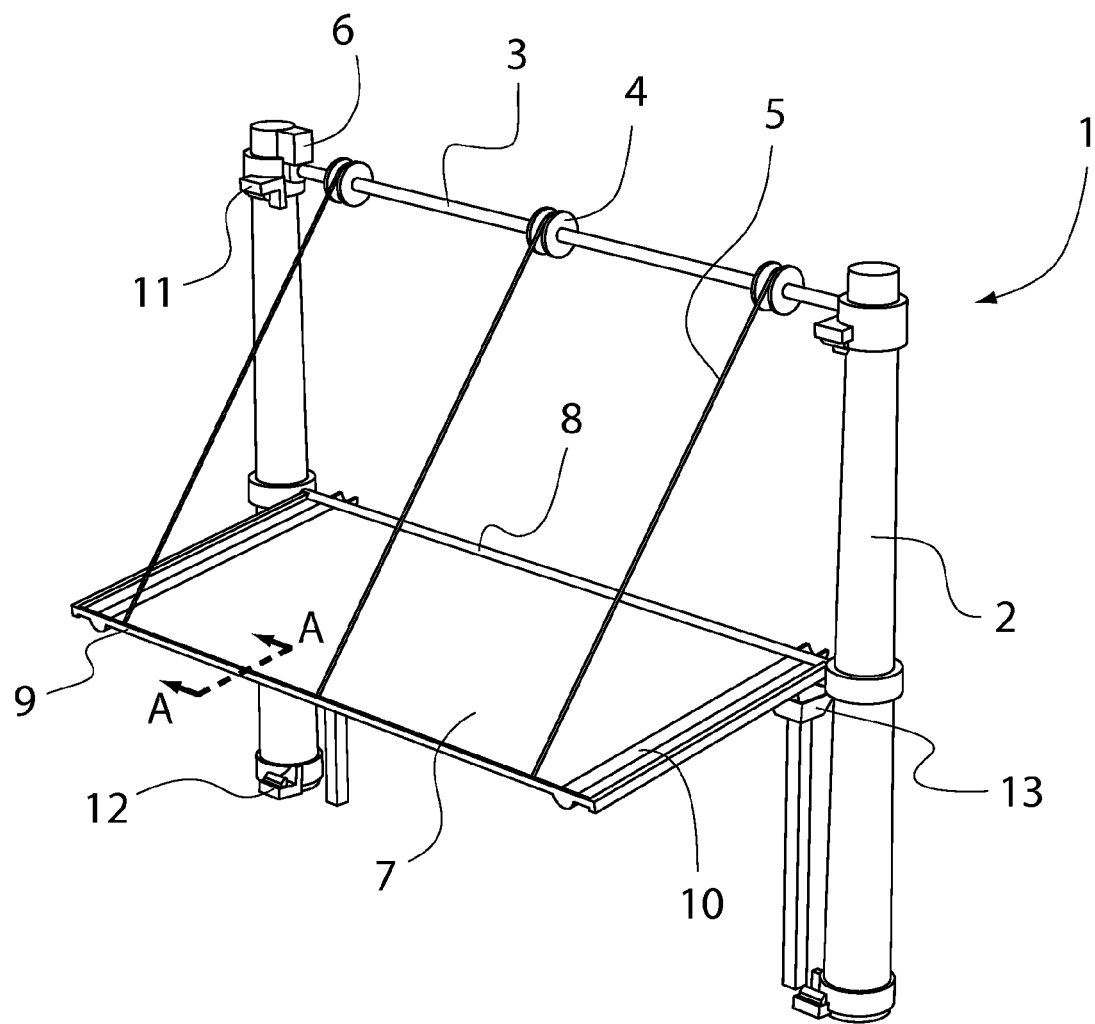
FIG. 1 is a perspective view of an embodiment of a plant growth promotion apparatus.

FIG. 1 shows an embodiment of a plant growth promotion apparatus 1, including two support posts 2 erected on the ground and spaced apart in a desert area. The support posts 2 are made of reinforced concrete, metal, wood, brick structure, composite material, or other suitable materials. Between the top portions of support posts 2 is supported a rotary rod 3 that is oriented approximately horizontal from end to end. The rotary rod 3 is rotatably attached to support posts 2 by shaft in rotary bearing or bushing structure. On rotary rod 3 are secured a plurality of wheels 4, which are either formed one piece with rotary rod 3, or assembled onto rotary rod 3. Rotary rod 3 and wheels 4 are made of metal, wood, or other suitable materials. Support posts 2 also support a blocking plate 7. Two blocking plates 7 can be supported by a pair of support posts, one on each side. For simplicity, only one blocking plate is illustrated in details. Blocking plate 7 shown in FIG. 1 has rectangular shape, although it can take other shapes and fulfill the same purpose. Blocking plate 7 is attached to support posts 2 through pivot joints at pivot edge 8 of the blocking plate. The pivot joints can be shafts extended from both ends of pivot edge 8 engaging rotary bearings or bushings that are affixed to support posts 2. Another type of pivot joint is formed by attaching a shaft between the two support posts 2 and engaging the shaft through bushings that are formed onto pivot edge 8 of blocking plate 7. In FIG. 1 are also shown cables 5 connecting wheels 4 and extending to edge 9 of blocking plate 7. Each cable 5, a cord made of metal wire or fabric material, or a chain, is attached to and wound on a wheel 4 on rotary rod 3 at one end and attached to extending edge 9 of blocking plate 7 at the other end. Cables 5 are strong enough to stand the weight of blocking plate 7 and hold blocking plate 7 in position against the violent force of wind gust and sandstorm at extreme weather conditions. An electric motor 6 is mounted onto one of the two support posts 2, as shown in FIG. 1, and is connected to rotary rod 3 through gears, belt and pulley, or chain and sprocket gear means, etc. Motor 6 can be a servo-motor or another type and is controlled manually, with an automatic control box (not shown), or by a computer system (not shown). On support posts 2 also attached upper position locks 11 and lower position locks 12, and their function will be evident in later paragraphs when the operation of plant growth promotion apparatus 1 is disclosed. Motor 6 and mechanical connections, such as the shaft to bearing connections described, are protected against the erosion of nature by enclosure or sealing.

Referring to FIG. 1, when electric motor 6 is turned on, the rotational movement is transmitted through transmission means, such as gears, belt and pulley, or chain and sprocket gear, to rotary rod 3 and to wheels 4 that are secured to rotary rod 3. A large RPM reduction from motor 6 to rotary rod 3 is achieved by a large gear ratio or transmission ratio. This large RPM reduction ensures a large torque on wheels 4 for pulling cables 5. The RPM reduction rate is in general greater than 10, and preferably greater than 100. The rotation of wheels 4 acts on cables 5, by either extending cables 5 or pulling back cables 5, and causes blocking plate 7 to move downward or upward swinging around pivot edge 8. When blocking plate 7 is at the upper approximately vertical position, it can be locked to the position by engaging upper position locks 11 to withstand wind gust and sandstorm. To rotate blocking plate 7 downward, motor 6 is turned on to extend cables 5, reaching the blocking position when the plate is approximately horizontal. At the blocking position, blocking plate 7 blocks the plants underneath against scorching sunlight or heavy rainstorm. Further extending cables 5 causes blocking plate 7 to rotate further downward, finally reaching the lower approximately vertical position. Again, blocking plate 7 can be locked to the lower approximately vertical position by lower position locks 12 to withstand wind gust or sandstorm. Likewise, blocking plate 7 can be rotated upward by turning electric motor 6 in the reverse direction to pull back cables 5. From the lower approximately vertical position to the upper approximately vertical position, blocking plate 7 swings up to 180°. The large RPM reduction rate from motor 6 to rotary rod 3 ensures that blocking plate 7 can be stopped at any position between the upper approximately vertical position to the horizontal blocking position, and to the lower approximately vertical position.

In FIG. 1 are also shown gutters 10 formed on blocking plate 7 close to the edges of bot sides. Gutter 10 can also be formed on a separate piece attached onto blocking plate 7, and it can take different arrangements. When blocking plate 7 is at the horizontal blocking position or inclined position with pivot edge 8 leveled with or lower than extending edge 9, gutters 10 are able to collect rainwater and channel the collected water to downspout 13, in FIG. 1.

Figure 2:
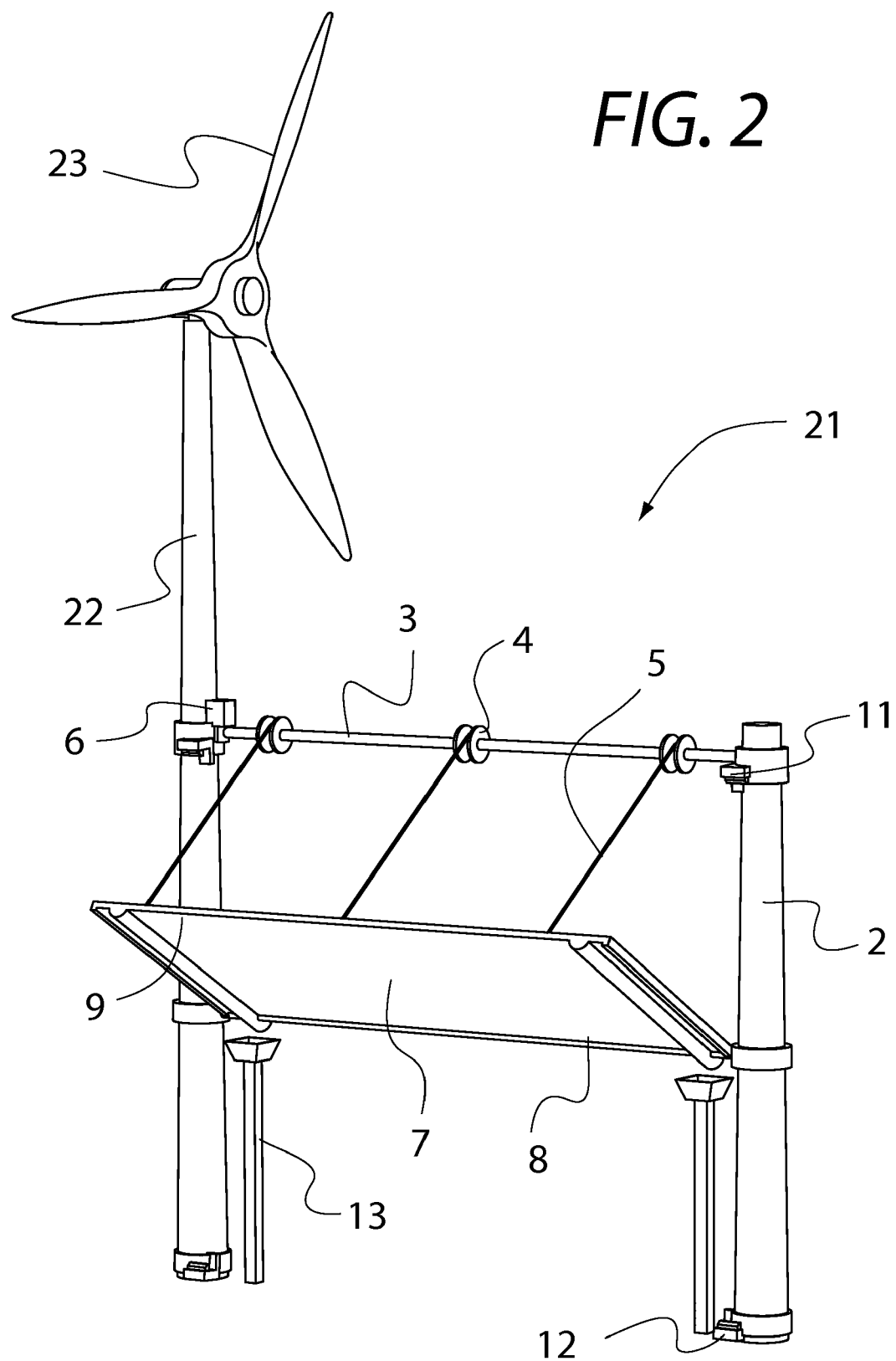
FIG. 2 is a perspective view of another embodiment of a plant growth promotion apparatus.

Another embodiment of plant growth promotion apparatus 21 is shown in FIG. 2. One support post 22 is made taller than the other support post 2, and a wind turbine 23 is attached to the top of support post 22. Alternatively, the plant growth promotion apparatus 21 can have two tall support posts 22, each carrying a wind turbine 23. The wind turbine produces electrical energy from wind power, which is excessive in desert areas and is usually harmful to plants. Except for generating electrical power, wind turbine 23 damps the wind speed to benefit the plant promotion purpose. Further, the profit of the electrical power generated helps offset the cost of building the plant growth promotion apparatus.

As shown in FIG. 3, preferably, blocking plate 7 has a multiple layer structure, including a base board layer 31, a solar cell layer 32, and optionally a transparent protection layer 33, which is, preferably, be hermetically sealed by sealant 34. The material of base board 31 is metal, plastic, composite material, wood, or other types of materials with proper mechanical strength. Solar cell 32 is a device that converts light energy to electrical energy, and it can be made of single layer silicon wafer, thin-film semiconductor, or other materials, such as polymer solar cell, dye sensitized solar cell, etc. The function of transparent protection layer 33 is to protect the solar cell layer against extreme weather conditions. The preferred material for transparent protection layer 33 is a thin layer of transparent plastic, such as Plexiglas, that is tough and durable. But glass or clear coating can also be used. Solar cell layer 32 and transparent protection layer 33 can be attached to base board layer 31 by adhesive or by mechanical fastener, such as bolt, screw, etc. During the day when blocking plate 7 is operated and moved to a horizontal or inclined position, solar cell 32 is facing the sun straightly or at an angle and can be turned on to convert the solar energy received into electrical energy. Similar to the wind turbine of FIG. 2, the electricity generated by solar cell 32 can financially offset the cost of building the plant growth promotion apparatus.

The dimensions of the apparatuses shown in FIGS. 1-3 depend on the weather and ground conditions of the desert area, and also the materials used to build the structure. Preferably, the span between the support posts 2 (22) is between 4-15 meters; the height of the pivot joints or the height of the blocking plate 7 when at the approximately horizontal blocking position is 3-15 meters; the size of the blocking plate 7 ranges from 4 by 3 meters to 15 by 15 meters. The height of wind turbine 23 needs to be high enough so that it does not reach any part of the plant promotion structure below it during operation.

Referring to FIG. 4, to cultivate plants in vast desert areas, the apparatus module depicted in FIG. 1, or in FIG. 2, can be populated. First, elements such as the blocking plate and the upper position locks, the lower position locks, etc. can be assembled to the other side of the support posts 2 or 22. Preferably, the structures on both sides of the support posts are the same, and they share the same rotary rod 3, wheels 4 and electric motor 6. Then, more support posts 2 or 22 can be erected, forming a row along the first two support posts. And the same structures between the first two support posts can be populated between the rest adjacent posts, establishing a row of plant growth promotion apparatuses 41. After that, more rows of plant promotion apparatuses 41 can be established to cover a large ground.

The plant growth promotion apparatus as shown in FIG. 1 and FIG. 2 can be run manually by field personnel or automatically by a control box (not shown) or a computer system (not shown). The photosynthesis process is a function of chloroplast in vegetation that uses sunlight as energy and consumes water and carbon dioxide from air, and produces glucose and emits oxygen into air. For each type of vegetation, there is an optimal range of sunlight intensity for the photosynthesis process to operate. When light intensity is too low, such as in early morning or evening, there is not enough light energy to drive the photosynthesis process. On the other hand, if light intensity is too high, there exists too much stress to leaves or other parts of the vegetation that chloroplast resides, causing photosynthesis rate to decrease. To the extreme, the excessive sunlight in a desert area can dehydrate the vegetation and kill it. In the field where plant growth promotion apparatus is erected, sunlight intensity can be sensed by a sunlight sensor (not shown). During a hot day when sunlight intensity as measured by the sunlight sensor exceeds a lower limit for plants, e.g., 10,000 lux, a decision is made, for example, by an automated computer system, to close the plant growth promotion apparatus. An instruction is sent to electric motor 6 to turn rotary rod 3 and wheels 4 to extend the blocking plate 7 to an inclined position. If all plant growth promotion apparatuses on the field are operated following the same instruction, at this point blocking plates 7 at two adjacent rows of plant growth promotion apparatuses form either ∧ or ∨ shape, so that sunlight is partially blocked and the plants underneath the blocking plates receive partial sunlight. Meanwhile, solar cell 32 on the blacking plates starts to work to convert sunlight energy into electrical energy. And, the generated energy is sent to a DC to AC power inverter to convert the energy to AC power before it is conveyed to an electricity network. When the sunlight sensor indicates that sunlight is extremely intense, e.g., an upper limit of 100,000 lux, blocking plates 7 of the plant growth promotion apparatus can be extended to the approximately horizontal position to totally block the sunlight. And, a maximum amount of electricity is generated by solar cell 32 at same time. Later during the day when the sunlight intensity drops below the upper limit, the automated computer system opens up the blocking plates partially. Finally, when the sunlight intensity was below the lower limit, motor 6 is instructed to move blocking plates 7 to full open position to allow maximum sunshine on the plants in the field. In this way, optimal photosynthesis can be maintained during daytime to effectively absorb carbon dioxide from the atmosphere.

A rain gauge can be installed in the field to detect the presence of rain or the rate of rainfall. Rainstorm information can also be obtained from local weather forecast. The desert soil is poor of retaining water, and heavy rain will flood over the surface and erode the top soil. Therefore, when heavy rainstorm comes the plant growth promotion apparatus in FIG. 1 or in FIG. 2 is instructed, for example, by an automated computer system, to close-off blocking plates 7 by moving them to the approximately horizontal blocking position. Preferably, blocking plate 7 is slightly slanted toward the direction of pivot edge 8 so that gutters 10 on blocking plate 7 collect the rainwater received on the blocking plate and flow the water to the downspouts 13 that are connected to duct or irrigation system on the ground. The collected rainwater can be stored in local reservoir for future irrigation purpose. In this way, the plant growth promotion system serves to solve the lack of water problem in desert areas by collection water from rainstorm and distribute it back to the plants over a substantially longer period. The plant growth promotion system can also be used in an area with excessive rainfall to collect the rainfall and convey it to a remote area. In this case, flooding can be prevented.

Figure 5:
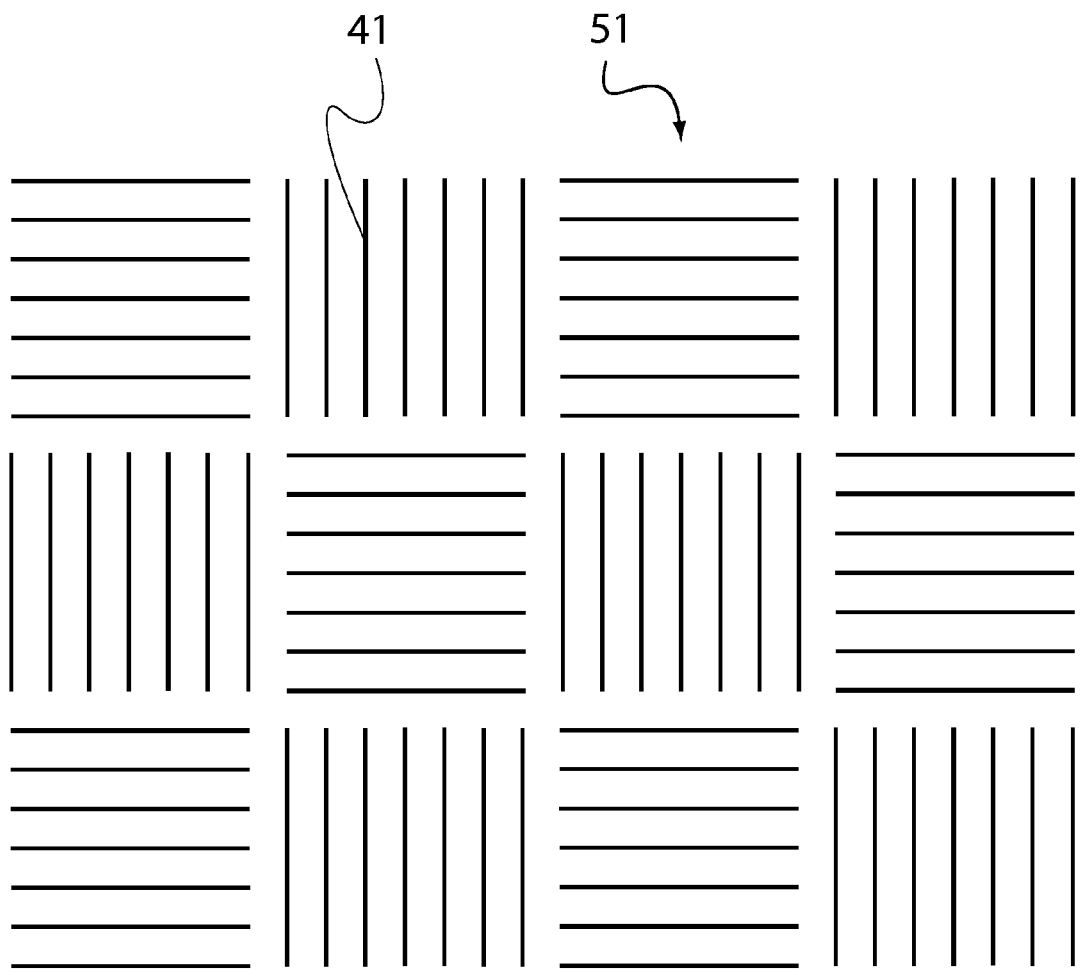
FIG. 5 is a schematic of another arrangement of many plant growth promotion apparatuses to protect plants against wind from different directions.

As shown in FIG. 4 and FIG. 5, the plant growth promotion apparatuses erected in a large area can be arranged to block wind gust or sandstorm, another type of extreme weather condition in desert. A wind meter can be installed in the field to measure wind speed. When the wind speed exceeds a limit, e.g., 100 kilometer per hour, motor 6 is instructed to move blocking plates 7 to one of the two approximately vertical positions. A further instruction is sent to lock the blocking plates 7 in place with upper position lock 11 or lower position lock 12, as shown in FIG. 4, so that blocking plates 7 can withstand the violent force of wind gust or sandstorm to effectively protect the plants from damage. Further, each row of plant growth promotion apparatuses can be coordinately operated so that the blocking pates on one side of the row are positioned to the lower approximately vertical position and the blocking plates on the other side are positioned to the approximately upper vertical position. Together, wind gust or sandstorm at the ground level and upper level is blocked. In FIG. 4, the predictable seasonal wind 42 is usually most damaging to plants. So, the rows of plant growth promotion apparatuses are set substantially perpendicular to the wind direction to effectively block the wind gust or sandstorm. In other desert areas where the direction of damaging wind is not as predictable, the arrangement in FIG. 5 is more effective. Super modules 51 of plant growth promotion apparatus can be established. And an angle is formed between rows of apparatuses in one super module to those of an adjacent super model. In FIG. 5, the angle between adjacent super models is 90°. Together, the setup of super models serves to block or damp wind from all directions in a large area.

The apparatus as described in FIGS. 1-3 can be designed so that it is easily to assemble and disassemble. A plan can be developed to reclaim desert starting from an area, for example, a desert boundary. The plant growth promotion apparatuses can be erected in the area following the description of this invention. And plants are grown in the area and protected by the apparatuses. Over years of maintenance, the plants are grown up and able to stand extreme weather conditions. And, the area is effectively converted from desert to usable land. At the time frame, a decision can be made to disassemble key elements of the plant growth promotion apparatuses, including rotary rods 3 and wheels 4, blocking plates 7, electric motors 6, etc. and to relocate them to a newly planned area. Over a prolonged period of time, more and more desert areas will be converted to usable land. As more plants grow healthily, more carbon dioxide in the atmosphere is consumed, and the threat of global warming is lessened. When vast desert lands are converted to usable land and plants grow successfully, the content of carbon dioxide in air reduces. The photosynthesis process of vegetations offered by the Mother Nature depends on the carbon dioxide content in air, and less carbon dioxide in air results in less photosynthesis and consequently less carbon dioxide absorption by the plants grown. Therefore, for longer term this invention helps regulate the carbon dioxide content in air.

It is understood that the above-described invention is merely illustrative of the possible specific embodiments which may represent principles of the present invention. Other arrangements may readily be devised in accordance with these principles by those skilled in the art without departing from the scope and spirit of the invention.

The invention claimed is:

1. An apparatus for plant growth promotion in a desert, comprising:
    at least two support posts;
    a rotary rod rotatably attached to the support posts;
    a plurality of wheels secured to the rotary rod;
    an electrical motor attached to one of the support posts;
    a blocking plate having a pivot edge that is connected to the support posts, the blocking plate being capable of swinging pivoting the pivot edge and holding in position between an approximately horizontal position and one or two approximately vertical positions;
    a plurality of cables, each cable attached to the blocking plate at one end and attached and wound on one of the wheels on the other end;
    a wind turbine attached to the top portion of one of the support posts and capable of generating electricity from wind; and
    whereby rotational movement of the electric motor is transmitted through transmission means to the rotary rod and the wheels secured thereon, as such to extend the cables to cause the blocking plate to swing downward, or to pull back the cables to cause the blocking plate to swing upward.

2. An apparatus as recited in claim 1 wherein:
the blocking plate includes a gutter capable of collecting rainwater.

3. An apparatus as recited in claim 1 further comprising:
a lower position lock attached to the lower portion of one of the support posts, capable of locking the blocking plate in a lower approximately vertical position.

4. An apparatus as recited in claim 1 further comprising:
an upper position lock attached to the upper portion of one of the support posts, capable of locking the blocking plate in an upper approximately vertical position.

5. An apparatus as recited in claim 1 wherein:
the support posts are made of reinforced concrete, metal, wood, brick, or composite material.

6. An apparatus as recited in claim 1 wherein:
the span between the adjacent support posts is 4 to 15 meters; the height of the pivot edge of the blocking plate is 3 to 15 meters; the size of the blocking plate ranges 4 by 3 meters to 15 by 15 meters.

7. An apparatus for plant growth production in a desert, comprising:
    at least two support posts;
    a rotary rod rotatably attached to the support posts;
    a plurality of wheels secured to the rotary rod;
    an electrical motor attached to one of the support posts;
    a blocking plate having a pivot edge that is connected to the support posts, the blocking plate being capable of swinging pivoting the pivot edge and holding in position between an approximately horizontal position and one or two approximately vertical positions, the blocking plate including a solar cell layer capable of generating electricity from sunlight;
    a plurality of cables, each cable attached to the blocking plate at one end and attached and wound on one of the wheels on the other end; and
    whereby rotational movement of the electric motor is transmitted through transmission means to the rotary rod and the wheels secured thereon, as such to extend the cables to cause the blocking plate to swing downward, or to pull back the cables to cause the blocking plate to swing upward.

8. An apparatus as recited in claim 7 wherein:
the blocking plate further includes a transparent protection layer.

9. An apparatus as recited in claim 7 wherein:
the blocking plate includes a gutter capable of collecting rainwater.

10. An apparatus as recited in claim 7 further comprising:
a lower position lock attached to the lower portion of one of the support posts, capable of locking the blocking plate in a lower approximately vertical position.

11. An apparatus as recited in claim 7 further comprising:
an upper position lock attached to the upper portion of one of the support posts, capable of locking the blocking plate in an upper approximately vertical position.

12. An apparatus as recited in claim 7 wherein:
the support posts are made of reinforced concrete, metal, wood, brick, or composite material.

13. An apparatus as recited in claim 1 wherein:
the span between the adjacent support posts is 4 to 15 meters; the height of the pivot edge of the blocking plate is 3 to 15 meters; the size of the blocking plate ranges 4 by 3 meters to 15 by 15 meters.

14. A method for plant growth promotion in a desert, the method comprising the steps of:
sensing weather condition using weather sensing means;
moving a blocking plate according to the weather condition to protect plants underneath, the blocking plate having a pivot edge that is rotatably supported by at least two support posts, the blocking plate connected through a plurality of cables to a rotary rod that has a plurality of wheels secured thereto and is rotatably attached to the support posts, each cable having one end attached to the blocking plate and the other end attached to and wounded on one of the wheels, whereby the blocking plate is operated by an electric motor attached to one of the support posts, and the motor transmits rotational movement through transmission means to the rotary rod and the plurality of wheels thereon as such to extend the cables to cause the blocking plate to swing downward, or to pull back the cables to cause the blocking plate to swing upward; and
generating electricity from a solar cell layer integrated to the blocking plate.

15. A method as recited in claim 14 wherein:
the weather sensing means is a sunlight sensor.

16. A method as recited in claim 14 wherein:
the weather sensing means is a wind meter.

* * * * *